UNITED STATES PATENT OFFICE.

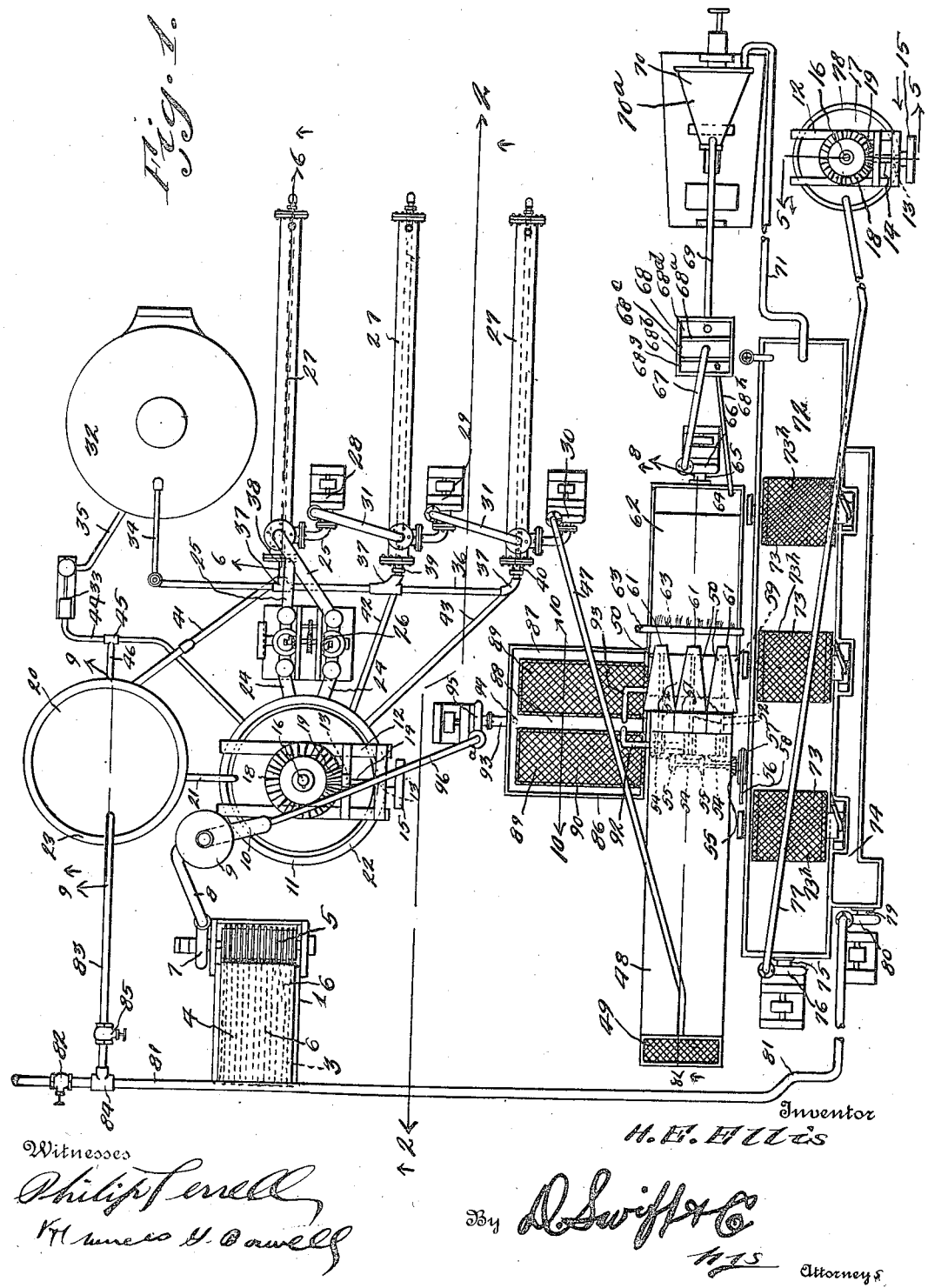

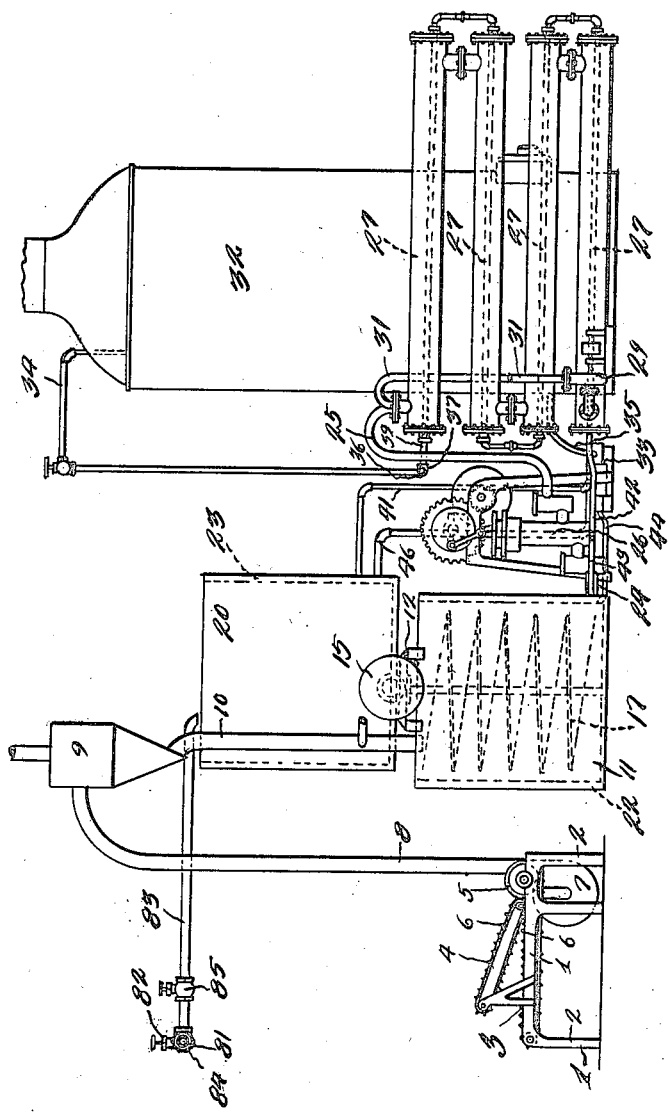

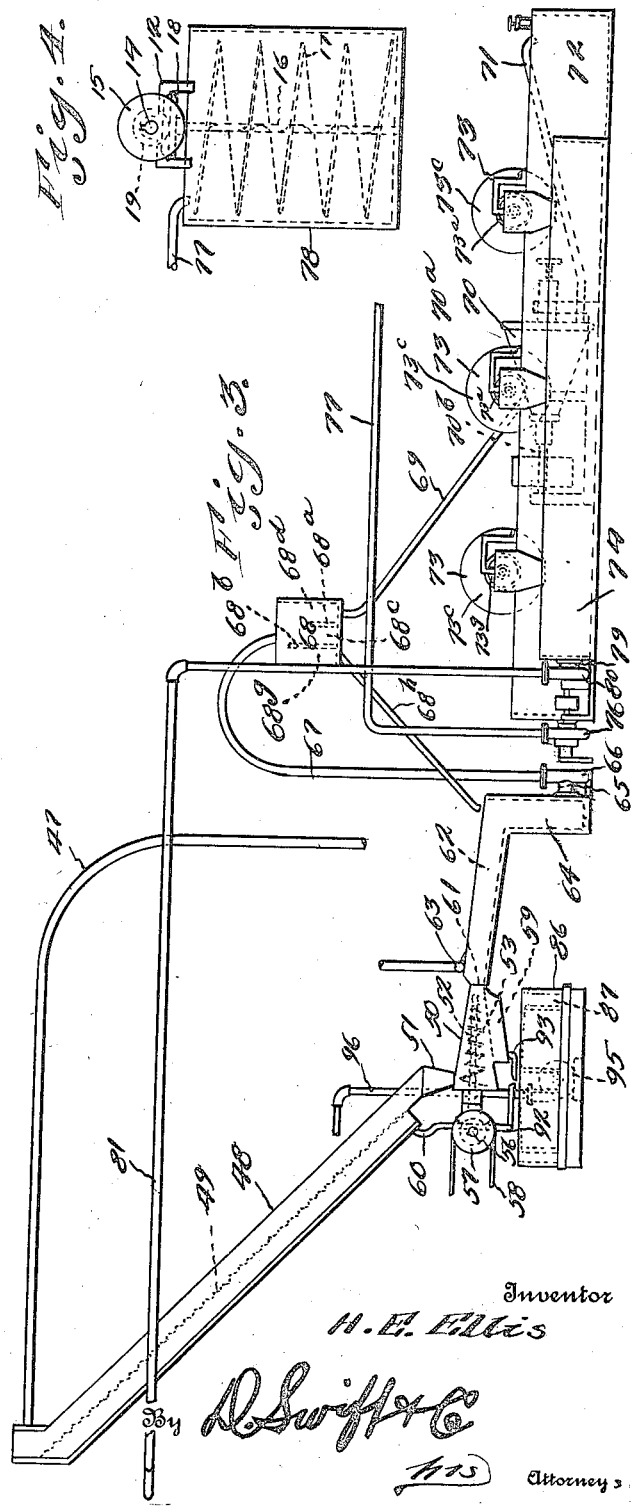

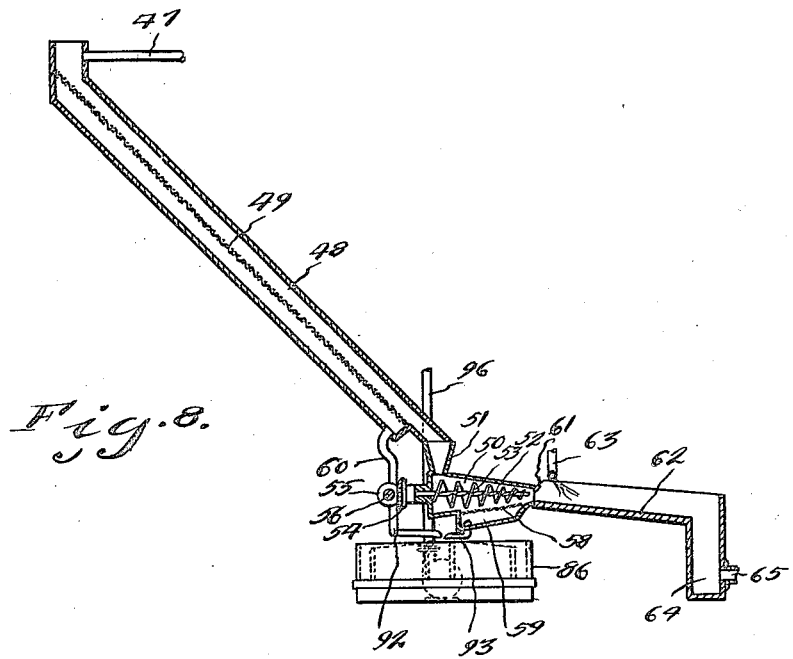
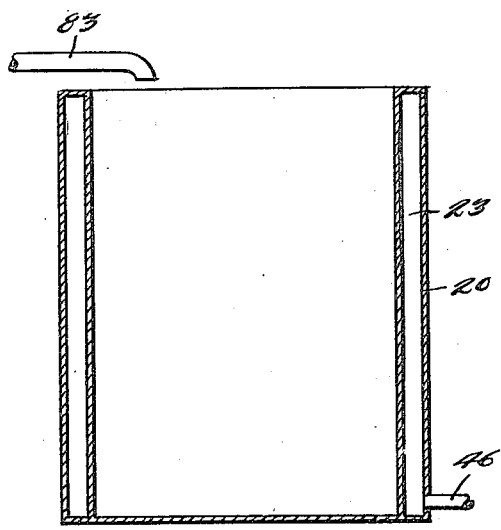
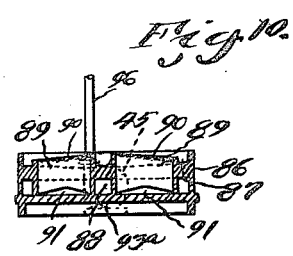

HARRY ELLWOOD ELLIS, OF PALMETTO, FLORIDA, ASSIGNOR OF ONE-HALF TO J. W. WILHELM, OF PALMETTO, FLORIDA.

METHOD FOR THE MANUFACTURE OF CELLULOSE.

1,236,072.

Specification of Letters Patent.   Patented Aug. 7, 1917.

Application filed January 24, 1917. Serial No. 144,168.

*To all whom it may concern:*

Be it known that I, HARRY E. ELLIS, a citizen of the United States, residing at Palmetto, in the county of Monatee, State of Florida, have invented a new and useful Method for the Manufacture of Cellulose; and I do hereby declare the following to be a full, clear, and exact description of the invention, such as will enable others skilled in the art to which it appertains to make and use the same.

This invention relates to an improved apparatus for the manufacture of cellulose from reeds, grasses, and similar fibrous plants, such as saw grass, spartina, wire grass, etc., and also from cocoanut fiber, the cellulose to be used for the manufacture of various articles.

One of the objects of the invention is to improve, simplify and render more practical the structure of the cellulose apparatus set forth, illustrated and claimed in the copending application filed the 12th day of January 1917, Serial Number 142,036.

A further object of the invention is the provision of an apparatus especially designed to receive freshly cut grass or other fibrous plants.

A further object of the invention is to provide means for shredding the grass or other fibrous plants.

A further object of the invention is to provide means for subsequently stirring or mixing, or agitating the shredded material.

A further object of the invention is the provision of means for introducing a suitable chemical solution and water into the material as it is agitated.

A further object of the invention is the provision of an apparatus of a particular kind, whereby freshly cut grass may be treated, and in this case, a very weak chemical solution and a very short treatment suffices to reduce the cellular tissue of the grasses or other fibrous material, whereby clean cellulose may be produced.

A further object of the invention is to provide means for subjecting the material to a high temperature of heat and steam, during the passage of the material through an undulated passage.

A further object of the invention is to provide means for squeezing or pressing the material subsequently to the treatment of heat, in order to remove substantially all the moisture and chemical solution.

A further object of the invention is the provision of means for saving or recovering the chemical solution, and conveying the same back to the tank or vat in which the material is agitated.

A further object of the invention is the provision of means for refining the material of cellulose subsequently to removing the chemical solution and moisture.

A further object of the invention is the provision of means for subjecting the cellulose to a final wash, after which the material is ready to be used in the manufacture of various articles.

In practical fields, the details of construction may necessitate alterations falling within the scope of what is claimed.

The invention comprises further features and combination of parts, as hereinafter set forth, shown in the drawings, and claimed.

In the drawings:—

Figure 1 is a view in plan of the entire plant or apparatus for the treatment of fibrous material, whereby the same may be reduced to cellulose of a refined nature.

Fig. 2 is a view in side elevation of the apparatus, taken on line 2—2 of Fig. 1.

Fig. 3 is a view in side elevation of a portion of the apparatus, whereby the material may be finally squeezed or compressed, subsequently refined and finally washed.

Fig. 4 is a view in side elevation of the agitating tank, with the agitator shown in dotted lines.

Fig. 5 is a sectional view through Fig. 1 on line 5—5.

Fig. 6 is a view in side elevation of one of the undulated steam passages through which the material passes.

Fig. 9 is a sectional view on line 9—9 of Fig. 1.

Fig. 10 is a sectional view on line 10—10 of Fig. 1.

Figs. 11 and 12 are transverse and longitudinal sections of the washing drums.

Figure 7:
Fig. 7 is a sectional view through Fig. 6.
Figure 8:
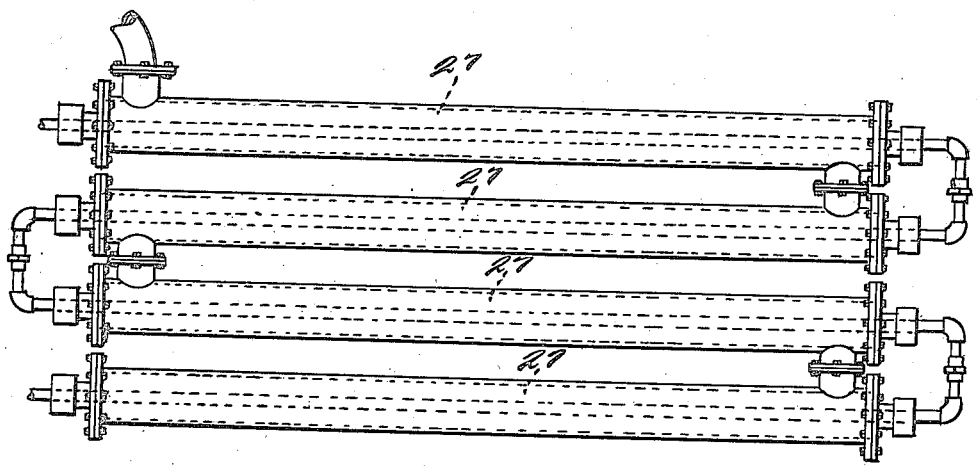
Fig. 8 is a view partly in section and partly in elevation for squeezing or compressing the material, whereby the chemical solution and moisture may be removed, on line 8—8 of Fig. 1.

Referring more especially to the drawings, 1 designates the frame of the shredding device, which is mounted upon suitable legs 2, and provided with shredding conveyers 3 and 4 and a shredding drum 5. The shredding conveyer 4 is inclined downwardly toward the shredding conveyer 3, and has one end close to said conveyer 3, so that the shredding projections 6 of both conveyers, at one end of the conveyer 4 will intermesh. The material, such as weeds, grasses, or similar fibrous plants, or cocoanut fiber or the like, after being shredded by the conveyers 3 and 4 and the drum 5, is removed from the shredder by means of the centrifugal or other pump 7, and lifted and passed through a pipe or conduit 8 into the separator 9, where the dust is separated from the fibrous material, so that the fibrous material may pass out through the pipe or conduit 10 into the tank or vat 11.

Mounted upon the vat or tank 11 is a frame 12, in bearings 13 of which a suitable shaft 14 is mounted. On one end of the shaft 14 is a suitable pulley to which any suitable power (not shown) may be belted. Mounted in a bearing of the top of the tank or vat 11 is a vertical shaft 16, which carries a suitable spiral or screw agitator 17. The upper end of the shaft 16 has a bevel gear 18, with which the bevel pinion 19, on the other end of the shaft 14 meshes, so that when motion is imparted to the shaft 14, the agitator 17 will be actuated. A suitable tank or vat 20 is provided in which the combination chemical solution and water is deposited. A suitable pipe 21 extends from the tank or vat 20, and connects to and in communication with the tank or vat 11, so as to convey the chemical solution into the vat or tank 11, where it may be mixed with the fibrous material, when the material is agitated.

The tanks 11 and 20, each have double walls, hence, providing both tanks with steam chambers 22 and 23, into which a high temperature of steam may be allowed to enter in order to subject the solution and the mixture of the fibrous material and the chemical solution to a high temperature of heat, in order to dissolve the mixture of the fibrous material and the solution.

In order to subject the mixture of the fibrous material and chemical solution to additional high temperature of steam heat and disintegration, said mixture is carried or conveyed through the pipes or conduits 24, to and through the pipes 25 by means of the multiple cylinder lifting pump 26, to and through the plurality of undulated passages 27, which consist of the tubular chambers. The mixture is carried from one undulated passage to the other and so on (it being understood that the number of passages may be increased or decreased) by means of the centrifugal pumps or the like 28, 29 and 30 and the connecting pipe 31. In order to subject the mixture to a high temperature of heat as it passes through said undulated passages, a suitable boiler 32 is provided, and also a pump 33. Extending from the steam dome of the boiler are the pipes 34 and 35, the pipe 35 being connected to the pump 33. The pipe 34 extends laterally from the dome and downwardly and then laterally at right angles to the first lateral portion, as shown in the plan view of Fig. 1, and connected to the second lateral portion 36 by the unions 37 are pipes 38, 39 and 40, which extend through the undulated passages respectively. In other words, these steam pipes 38, 39 and 40 are also undulated correspondingly to said undulated passages. These pipes 38, 39 and 40 after leaving said passages are provided with extension pipes 41, 42 and 43. The extension pipes 42 and 43 connect to and are in communication with the steam chamber 22 of the tank or vat 11, while the extension pipe 41 connects to and is in communication with the annular steam chamber 23 of the tank or vat 23, whereby the steam (after being used to impart a high temperature of heat to the mixture in said passages) may be conveyed to said annular steam chambers of said tanks, to subject the solution and mixture to high temperature of steam heat. A pipe 44 extends from the pump 33 to and in communication with the annular steam chamber of the tank or vat 11, and connected to the pipe 44 by a union 45, is a pipe 46, which in turn is connected to the tank 20 and in communication with the annular steam chamber 23. By virtue of said pipes 44 and 46, the pump 33 and the pipe 35, the steam from said annular chambers 22 and 23 of said tanks 11 and 20, that is, the condensation of steam, is carried back to the boiler. These parts numbered respectively from 24 to 46, inclusive, are substantially identical in construction and operation with similar parts or devices shown, described and claimed in said co-pending application, hence, their detail constructions are not herein particularly specified. However, their operations will be subsequently briefly set forth in the present application.

After the mixture has been subjected to high temperature of steam heat and thorough disintegration by means of the devices numbered 24 to 46 inclusive, it is lifted into the pipe or conduit 47 by means of the centrifugal pump 30. This pipe or conduit 47 conveys the mixture to the chute 48, which may be inclined upon any suitable angle. Arranged in said chute 48 longitudinally thereof is a screen 49. The lower end of the chute 48 connects to a plurality of horizontally disposed conical or otherwise suitably shaped compressing chambers 50, by means of a plurality of vertical conical connections 51. Mounted in suitable bearings of the compressing chambers 50 are shafts 52 provided with conical spiral or screw compressors 53. These shafts 52 are provided with bevel gears 54, which mesh with the bevel gears 55, which are mounted upon the shaft 56. One end of this shaft 56 has a suitable pulley 57, which may be belted to any suitable power, not shown, by means of the belt 58, whereby motion may be imparted to the spiral or screw compressors 53 respectively. The lower wall of each compressor chamber 50, for the greater part of its length, is open, and is provided with a suitable screen member 58. Below said compressor chambers and in communication therewith, respectively, by virtue of the screened openings, is a compartment 59. The mixture, when conveyed to the tube 48, gravitates down inclined screen 49, and then into the respective compressor chambers. The combined water and chemical solution that drains from the mixture through the screen 49 during the travel of the mixture passes off from the chute 48 into and through a pipe. The mixture, when it enters the respective compressing chambers 50, is compressed or squeezed by the screws or spiral compressors and fed out through the outlets 61, into the trough 62, where the mixture is given a fresh water spray bath by means of the spray pipe 63, which may receive its supply from any suitable source, not shown. The mixture, after receiving its spray bath, is removed from the lower part 64 of the trough, through the pipe 65, and lifted by means of the centrifugal pump or suitable device 66 through the pipe 67 into the mixing box 68, where it may be more thoroughly mixed by any suitable means therein, not shown. The mixture or cellulose is then carried by the pipe 69 to the refining device 70, from whence it is carried by the pipe or conduit 71 into the trough 72, where the material is given a wash or thorough rubbing, by means of the washer drums 73. The cellulose or mixture is taken from trough 72 through the pipe 75 by means of the centrifugal pump or the like 76 and lifted into the pipe or conduit 77, which conveys the cellulose to the tank or receptacle 78, where it is given a final agitation, by means of an agitator similar to the agitator in the tank or vat 11, which agitator may be actuated by suitable means or mechanism similar to that carried by the tank 11, the parts or elements of which mechanism or means are designated by similar reference characters. The water from the trough 74 passes off through the pipe 79, and is lifted by the centrifugal pump or the like 80 into and through the pipe or conduit 81, from which it may be emptied into any suitable receptacle, not shown, or conveyed to any suitable remote location. By means of the valve 82 in said pipe 81, the water may be controlled. A pipe 83 connects to the pipe 81 by means of a union 84, and is in turn connected to and in communication with the tank 20. The pipe 83 has a valve 85, and by opening said valve, the water from the pipe 81 may be allowed to enter the tank 20 and mix with the chemical solution.

In order to recover the chemical solution, after having been squeezed or removed from the mixture by the screw compressors, a receptacle or trough or casing 86 is provided. This casing or trough, as shown in Figs. 1 and 10 clearly, is so constructed or divided as to provide a marginal channel 87 and a cross channel 88 communicating with the marginal channel. This trough or receptacle also is provided with compartments 89, provided with screen tops 90. The bottoms of the compartments are in communication with said channels, by the openings 91. The screens 90, in practice, should be very fine, substantially a hundred mesh, so that the finest particles that may remain in the chemical solution (as it passes from the two pipes 92 and 93) may be retained upon the screen, while the chemical solution will pass through the pipe 93 at the outlet 94. The chemical solution is lifted from the pipe 93 by the centrifugal pump or the like 95 and forced through the pipe or conduit 96 (which connects to and in communication with the pipe or conduit 10) so as to be carried back to the pipe 10, and thence into the tank or vat 11, where it again mixes with the mixture. The pipe 93 extends from the compartment 59.

The operation of disintegrating and subjecting the mixture to a high temperature of steam heat by means of the parts or devices numbered respectively from 24 to 46, inclusive, is the same as that in the co-pending application, and is stated as follows:—

In the operation the fibrous material in a finely divided ground condition mixed with a suitable quantity of a necessary chemical solution and of such consistency capable of being pumped, is pumped or forced through the pipes 24 and 25, and into the undulated passages, by means of the stuff pumps 26. The material passes through the several undulated passages and is kept slowly and continuously moving therethrough. The centrifugal pumps or the like 28 and 29 are driven at such speeds as to be kept timed or in unison with the stuff pumps 26, whereby the material, (which discharges from the centrifugal pump 29) may be kept moving by the action of the pumps 28 and 29 through the final undulated passage 27, at substantially the same rate of speed as when moving through the former undulated passages. The jacketed tank 11 performs the dual purpose of pre-heating the material and obtaining the water from the condensation of the steam from the steam boilers.

By pre-heating the material, it is rapidly brought to a boiling point, when passing through the undulated passages, by the heat radiating from the steam pipes (which pass through said passages) which are kept at a high temperature by means of the super-heated steam from the boiler. The material, after passing through the undulated passages, is subjected strongly to trituration, while in a boiling condition, by means of the centrifugal pumps 28, 29 and 30. By means of the pumps 28 and 29 the material is carried from one undulated passage to the other, and then to the final undulated passage, and the operations may be repeated. Additional passages of undulated contours may be added according to the kind of raw material to be reduced, and the quantity and quality of the finished product desired. The effect on the raw material of boiling in a chemical solution or trituration by the centrifugal pumps alternately, is to rapidly and completely disintegrate the cellular tissue, so that clean cellulose in quantity may be produced at a low cost.

Further, in the operation of this apparatus, the freshly cut grass, reeds, or the fibrous material from other fibrous plants or the like, is fed into the shredder, where it is finally divided longitudinally and cut into the proper lengths. The grasses or fibrous material is then drawn out from under the shredder roller, by means of the centrifugal exhaust fan or the like 7, and discharged through the pipe 8 into the separator 9. In shredding the material, a considerable quantity of the cellular tissue of the grass or the like is reduced to the form of dust, which, together with a certain proportion of moisture, is discharged at the top of the separator 9. The fiber is discharged through the pipe 10, into the stuff tank or vat 11, where it is combined and well mixed with a weak solution of caustic soda, which may be drawn from the tank or vat 20. The solution of caustic soda in the tank or vat 20 is kept at a density considerably above the standard. However, the largest portion of caustic liquid or solution in the tank or vat 11 is attained by recovering the solution or liquid from the separator or recovering device 86, through the medium of the centrifugal pump 95, through the pipe 96, and thence, into the pipe or conduit 10, where it mixes with the fiber or material on its way to the vat 11. The caustic soda solution in the tank or vat 20 is maintained at a point much above the standard, and is used as required, to keep the recovered solution up to standard. The fiber and the caustic soda solution are well mixed or agitated in the tank or vat 11, in proper proportions and of the right consistency for pumping, and this mixture is drawn from the vat or tank 11 by means of the struck pump 26 through the pipes 24 and 25 and carried into the first continuous passage 27, where the mixture is subjected to the high temperature of steam heat. Owing to the tanks or vats 11 and 20 being subjected to steam heat, the mixture of fiber and the caustic solution will be kept moderately warm, therefore, when this mixture is discharged into the first undulated continuous passage, the mixture will be rapidly raised to a boiling point, owing to the super-heated steam from the boiler 32 passing through the undulated steam pipe of the first undulated passage for the cellulose. The stuff or mixture of fiber and the caustic soda solution is kept moving slowly through the undulated continuous passage of the first section, and having been already warmed, quickly reaches the boiling point, without any pressure being raised in the undulated passage. The steam pipe which passes through each undulated or continuous passage is connected at alternate ends of the different conduits forming said passage, thereby forming a continuous steam passage, through all four of the conduits of each undulated passage. The stuff or mixture of chemical and the fiber having passed through all four of the conduits of the first undulated passage, reaches the pump 28, which, in turn discharges the material to the upper conduit or pipe of the second undulated passage, where the operation is repeated. The stuff being constantly in contact with the steam pipes, at a high temperature, the boiling is carried on actively. The duration of the boiling of the stuff or mixture is regulated by the speed and capacity of the stuff pump 26, and by the capacity of the conduits of the first undulated passage. The material or mixture, after passing through all the conduits of all three or more undulated passages, it is discharged by the centrifugal pump 30, through the pipe 47 on to the upper end of the screen 49 of the chute 48. The fiber slides down the upper surface of the screen, while the solution percolates through the screen and flows down the chute, that is, under the screen. This solution from the trough, passes through the pipe 60 into the receptacle or trough or casing 86, the screen 90 acting to retain any small particles of the fiber. This casing or trough 87 may be entitled "save-all." The solution is drawn off through the pipe 93 by means of the centrifugal pump 95 and fed through the pipe 96 to the conduit or pipe 10, so as to mix with the fiber as it passes into the vat or tank 11. This solution, when fed into the trough or casing 86, rises in the marginal channel 87 and the cross channel 88, so as to overflow through the screens 90 into the compartments 89. Owing to the screens 90 being of a fine wire fabric or cloth, possibly of a hundred mesh, retains any fiber, which may have passed through the screen 49 of the chute. The fibrous material or cellulose which travels down the inclined screen 49, passes through the vertical conical hoppers 51 into the compressing chambers 50, where the fiber or cellulose is thoroughly compressed or squeezed by means of the spiral or screw compressors or squeezers. The object in squeezing or compressing the fiber or cellulose as much as possible, is to remove any remaining chemical solution, which passes out through the pipe 93 into the cross channel of the receptacle or casing 86, and is hence carried back to the vat or tank 11 through the medium of the pipe 10. All of the chemical solution that is returned to the vat or tank 11 is brought up to standard strength by the addition of a sufficient quantity of fresh solution from the tank or vat 20. The fiber or cellulose that is discharged from the compressors or squeezers fall into a shallow trough 62, down which it is washed by a spray of water from the spray pipe 63 into the lower part or stuff box 64 of said trough. This spray of water partially washes the pulp or cellulose and regulates the consistency as required for treatment in the refiner. The stuff or cellulose is discharged from the lower part or box 64 by means of the pump 66 into a mixing box of the ordinary type, and from this mixing box 68 (which regulates the flow of the stuff or cellulose to the refiner) through the pipe 69, and to the refiner 70. After the stuff or cellulose has been refined, it is discharged into one end of the washing trough 72 by means of the pipe 71. Sufficient water is added to the material in said trough 72, in order to wash out any chemicals remaining in the pulp or cellulose, by rotating the drum washers 73 in any suitable manner. The pulp or cellulose, after having been thoroughly washed by the drum washers, is drawn from the trough 72 by means of the centrifugal pump 76 and is passed through the pipe 77 and into the machine stuff chest or tank 78, where it is finally and thoroughly agitated after which it may be used for various purposes. The water from the trough 72 passes into the trough 74, from which it is drawn by the centrifugal pump 80 and carried through pipe 81 from which it may be discharged by opening the valve 82 or may be passed through the pipe 83 back to the vat or tank 20 by opening the valve 85 and closing the valve 82. The water that is carried back to the vat or tank 20 contains such a small quantity of caustic soda, that it may be used as far as possible in making fresh solution.

The washing drums 73, each consists of a series of blades having their outer portions bent to form flanges $73^a$, which extend in the direction of rotation of the drum. These blades $73^b$ extend the full length of the drum, and are connected to the opposite drum heads $73^c$ and $73^d$. One of the drum heads, for instance, $73^c$ has a flanged outlet opening $73^g$. As the cellulose enters the trough 72 with the water, whereby such mixture may be washed, the pulp adheres to the screening or wire fabric $73^h$ of the drums, while the water is picked up by the blades, and flows out through the flanged opening $73^g$ into the trough 74, from which it is removed by the pump 80 and conveyed by the pipe 81 to the tank or vat 20.

With reference to the refiner 70, which consists of the hollow cone member $70^a$, which is mounted on the shaft $70^b$, but not rotatable with the shaft, receives the cellulose, and by suitable means, not shown in the cone member, the cellulose is refined. The box 68 has two partitions, $68^a$ and $68^b$, thereby forming three compartments, $68^c$, $68^d$, and $68^e$. The cellulose, in leaving the pipe or tube 67, enters the compartment $68^c$, and overflows the partition $68^a$, and passes out through the pipe 69 to the refiner. However, should the refiner receive more cellulose than it can handle, the mixture backs up in the box 68 until it overflows the partition $68^b$, and flows back into the lower part 64 of the trough 62, by way of the pipe $68^h$. The mixture that is returned to the lower part of the trough 64 may again be removed by the pump 66 and sent through the pipe 67 to said box 68.

The invention having been set forth, what is claimed as new and useful is:—

1. A method for the manufacture of cellulose, consisting first in shredding the fibrous material, introducing the same into a separator, separating the fiber from the dust, pre-heating the fiber, agitating the fiber while it is being pre-heated, so handling the fiber as to reduce it to a restricted sinuous flow, and subsequently raising the sinuous flow of fiber to a boiling point.

2. A method for the manufacture of cellulose, consisting first in shredding the fibrous material, introducing the same into a separator, separating the fiber from the dust, pre-heating the fiber, whereby it may subsequently be brought to a boiling point, introducing the chemical solution of caustic soda, and then agitating the mixture of chemical solution and the fiber while being pre-heated.

3. A method for the manufacture of cellulose, consisting first in shredding the fibrous material, introducing the same into a separator, separating the fiber from the dust, pre-heating the fiber, whereby it may subsequently be brought to a boiling point, introducing the chemical solution of caustic soda, and then agitating the mixture of chemical solution and the fiber while being pre-heated, said chemical solution of caustic soda being pre-heated prior to introduction into the fibrous material.

4. A method for the manufacture of cellulose, consisting first in shredding the fibrous material, separating the fiber from the dust thereof, introducing a pre-heated chemical solution of caustic soda into said fiber, pre-heating the combined mixture, whereby the same may be subsequently brought to a boiling point, and agitating the combined mixture while being pre-heated.

5. A method for the manufacture of cellulose, consisting first in shredding the fibrous material, separating the fiber from the dust thereof, introducing a pre-heated chemical solution of caustic soda into said fiber, pre-heating the combined mixture, whereby the same may be subsequently brought to a boiling point, and agitating the combined mixture while being pre-heated, and then subjecting the mixture to a high temperature of steam heat, whereby the same, owing to its prior pre-heated condition, may be brought to a boiling point.

6. A method for the manufacture of cellulose, consisting in subjecting shredded fiber to heat or pre-warming the same, introducing a pre-heated chemical solution of caustic soda into the fiber, and then agitating the combined mixture.

7. A method for the manufacture of cellulose, consisting in pre-heating the same, introducing a pre-heated chemical solution of caustic soda, into the fiber, agitating the combined mixture, and then subjecting the mixture to a high temperature of steam heat, whereby the mixture, owing to its pre-heated condition, may be brought to a boiling point.

8. A method for the manufacture of cellulose, consisting in pre-heating the same, introducing a pre-heated chemical solution of caustic soda into the fiber, agitating the combined mixture, and then subjecting the mixture to a high temperature of steam heat, whereby the mixture, owing to its pre-heated condition, may be brought to a boiling point, and then separating the chemical solution of caustic soda and the fiber.

9. A method for the manufacture of cellulose, consisting in preheating the same, introducing a pre-heated chemical solution of caustic soda into the fiber, agitating the combined mixture, and then subjecting the mixture to a high temperature of steam heat, whereby the mixture, owing to its pre-heated condition, may be brought to a boiling point, and then separating the chemical solution of caustic soda and the fiber, in recovering and returning the chemical solution of caustic soda back to the combined mixture of soda and fiber.

10. A method for the manufacture of cellulose, consisting in pre-heating the same, introducing a pre-heated chemical solution of caustic soda into the fiber, agitating the combined mixture, and subjecting the mixture to a high temperature of steam heat, whereby the mixture, owing to its pre-heated condition, may be brought to a boiling point, and then separating the chemical solution of caustic soda and the fiber, in recovering and returning the chemical solution of caustic soda back to the combined mixture of soda and fiber, and then squeezing or compressing the separated fiber.

11. A method for the manufacture of cellulose, consisting in pre-heating the same, introducing a pre-heated chemical solution of caustic soda into the fiber, agitating the combined mixture, and then subjecting the mixture to a high temperature of steam heat, whereby the mixture, owing to its pre-heated condition, may be brought to a boiling point, and then separating the chemical solution of caustic soda and the fiber, and then squeezing or compressing the separated fiber.

12. A method for the manufacture of cellulose, consisting in pre-heating the same, introducing a pre-heated chemical solution of caustic soda into the fiber, agitating the chemical solution, and then subjecting the mixture to a high temperature of steam heat, whereby the mixture, owing to its pre-heated condition, may be brought to a boiling point, and then separating the chemical solution of caustic soda and the fiber, and then squeezing or compressing the separated fiber, and then subjecting the fiber to a spray bath, and then returning the chemical solution which has been compressed or squeezed from the fiber back to the combined mixture.

13. In a method for the manufacture of cellulose, consisting of the combination of pre-heating shredded fiber and pre-heating a chemical solution of caustic soda, of introducing the soda in its pre-heated condition into the fiber, pre-heating the combined mixture, agitating the mixture during the introduction of one into the other, subsequently raising the mixture to a boiling point, and then separating the fiber from the chemical solution of soda.

14. A method for the manufacture of cellulose, consisting in subjecting the combined mixture of shredded pre-heated fiber and chemical solution of caustic soda to a high temperature of steam heat to bring the same to a boiling point, and then separating the fiber and the chemical solution of soda, returning the chemical solution of caustic soda back to the pre-heated mixture, and then subjecting the fiber to a spray bath.

15. A method for the manufacture of cellulose, consisting in subjecting the combined mixture of shredded pre-heated fiber and a chemical solution of caustic soda to a high temperature of steam heat to bring the same to a boiling point, and then separating the fiber and the chemical solution of soda, then squeezing or compressing the fiber, removing substantially all the remaining solution, returning said solution back to said combined mixture.

16. A method for the manufacture of cellulose, consisting in subjecting the combined mixture of shredded pre-heated fiber and a chemical solution of caustic soda to a high temperature of steam heat to bring the same to a boiling point, and then separating the fiber and the chemical solution of soda, then squeezing or compressing the fiber, removing substantially all the remaining solution, returning said solution back to said combined mixture, and then subjecting the fiber to a spray bath.

17. A method for the manufacture of cellulose, consisting in subjecting the combined mixture of shredded pre-heated fiber and a chemical solution of caustic soda to a high temperature of steam heat to bring the same to a boiling point, and then separating the fiber and the chemical solution of soda, then squeezing or compressing the fiber, removing substantially all the remaining solution, returning said solution back to said combined mixture, and then subjecting the fiber to a spray bath, in subjecting the water from the bath and the fiber to a mixing process, and then refining the fiber.

18. A method for the manufacture of cellulose, consisting in subjecting the combined mixture of shredded pre-heated fiber and a chemical solution of caustic soda to a high temperature of steam heat to bring the same to a boiling point and then separating the fiber and the chemical solution of soda, then squeezing or compressing the fiber, removing substantially all the remaining solution, returning said solution back to said combined mixture, and then subjecting the fiber to a spray bath, in subjecting the water from the bath and the fiber to a mixing process, and then refining the fiber, then washing the fiber, removing the water, and finally agitating the fiber.

19. A method for the manufacture of cellulose, consisting in shredding the fiber, separating the fiber from the dust thereof, pre-heating the fiber, introducing a pre-heated chemical solution of caustic soda into the fiber, agitating the mixture, subjecting the mixture to a high temperature of steam heat, whereby the mixture, owing to its pre-heated condition, is brought to a boiling point, separating the chemical solution of caustic soda from the fiber, recovering said chemical solution, conveying the solution back to the pre-heated mixture, squeezing or compressing the fiber, thereby removing any remaining chemical solution, conveying said remaining chemical solution back to the mixture, subjecting the fiber, after its compression, to a fresh water spray bath, mixing said water and fiber, refining the fiber, washing the fiber, removing the water therefrom and conveying the same back to the pre-heated chemical solution, and then finally agitating the fiber, subsequently to which the cellulose or fiber is ready for use.

20. In a method for the manufacture of cellulose, consisting of the combination of pre-heating shredded fiber and pre-heating a chemical solution of caustic soda, of introducing the soda in its pre-heated condition into the fiber, pre-heating the combined mixture, agitating the mixture during the introduction of one into the other, so handling the fiber as to reduce it to a restricted sinuous flow, subsequently raising the fiber to a boiling point during its sinuous flow, and then separating the fiber and the chemical solution of caustic soda.

In testimony whereof I have signed my name to this specification in the presence of two subscribing witnesses.

HARRY ELLWOOD ELLIS.

Witnesses:
J. O. BROWN,
B. J. STERN.